(12) United States Patent
Nonninger

(10) Patent No.: US 8,057,688 B2
(45) Date of Patent: Nov. 15, 2011

(54) PURIFICATION METHOD FOR EFFLUENT

(75) Inventor: Ralph Nonninger, Saarbrücken (DE)

(73) Assignee: ITN Nanovation AG (DE)

( * ) Notice: Subject to any disclaimer, the term of this patent is extended or adjusted under 35 U.S.C. 154(b) by 517 days.

(21) Appl. No.: 12/278,799

(22) PCT Filed: Feb. 17, 2007

(86) PCT No.: PCT/EP2007/001383
§ 371 (c)(1),
(2), (4) Date: Feb. 20, 2009

(87) PCT Pub. No.: WO2007/093441
PCT Pub. Date: Aug. 23, 2007

(65) Prior Publication Data
US 2009/0255867 A1    Oct. 15, 2009

(30) Foreign Application Priority Data
Feb. 17, 2006    (DE) .......................... 10 2006 008 453

(51) Int. Cl.
*B01D 37/00*    (2006.01)
(52) U.S. Cl. ...................... 210/767; 210/510.1; 210/501
(58) Field of Classification Search .................. 210/767, 210/510.1, 501
See application file for complete search history.

(56) References Cited

U.S. PATENT DOCUMENTS

| | | | |
|---|---|---|---|
| 5,749,232 A * | 5/1998 | Sauer | ............................ 62/50.1 |
| 6,214,227 B1 | 4/2001 | Park et al. | |
| 2003/0132160 A1 | 7/2003 | Khudenko | |
| 2003/0132174 A1 | 7/2003 | Isomura et al. | |
| 2006/0175256 A1 * | 8/2006 | Masten et al. | ................ 210/638 |

FOREIGN PATENT DOCUMENTS

| | | |
|---|---|---|
| DE | 196 23 592 C1 | 1/1998 |
| DE | 298 19 446 U1 | 5/1999 |
| DE | 198 07 769 A1 | 8/1999 |
| DE | 198 07 890 A1 | 8/1999 |
| DE | 199 53 459 A1 | 5/2001 |
| DE | 101 27 554 A1 | 12/2002 |
| DE | 203 15 541 U1 | 12/2003 |
| DE | 298 25 005 U1 | 6/2004 |
| DE | 20 2004 010 485 U1 | 12/2004 |
| DE | 103 22 015 A1 | 12/2004 |
| EP | 0 812 807 A2 | 12/1997 |
| EP | 0 899 003 A1 | 3/1999 |
| EP | 1 034 835 A1 | 9/2000 |
| JP | 63-214177 A | 9/1988 |
| JP | 2001-233681 A | 8/2001 |
| JP | 2003-311131 A | 11/2003 |
| WO | 91/11396 A1 | 8/1991 |
| WO | 03/095077 A1 | 11/2003 |

* cited by examiner

*Primary Examiner* — Chester Barry
(74) *Attorney, Agent, or Firm* — DLA Piper LLP (US)

(57) ABSTRACT

A filtration appliance for wastewater purification, preferably for a sewage treatment plant, in particular for a small sewage treatment plant, including at least one ceramic-based membrane for separating off microorganisms, to a sewage treatment plant having such a filtration appliance, a method of purifying wastewater, in particular in a sewage treatment plant, wherein microorganisms present in the wastewater are separated off by means of at least one ceramic-based membrane, and also to the use of a ceramic-based membrane as filter for separating off microorganisms and, if appropriate, fine solids, from wastewaters.

21 Claims, 2 Drawing Sheets

PURIFICATION METHOD FOR EFFLUENT

RELATED APPLICATION

This is a §371 of International Application No. PCT/EP2007/001383, with an international filing date of Feb. 17, 2007 (WO 2007/093441 A1, published Aug. 23. 2007), which is based on German Patent Application No. 102006008453.5, filed Feb. 17, 2006.

TECHNICAL FIELD

This disclosure relates to a filtration device for wastewater purification, preferably for a sewage treatment plant, to a sewage treatment plant having such a filtration device, to a method of purifying wastewater, in particular wastewater in a sewage treatment plant, and also to the use of a ceramic-based membrane for separating off microorganisms, and if appropriate, also fine solids, from wastewaters.

BACKGROUND

In addition to screens and settling tanks which, in a first step, free wastewaters from coarse components, conventional sewage treatment plants also contain an activation tank and a secondary clarification tank. In the activation tank, microorganisms are used to decompose fecal matter or other organic substances. The microorganisms used are separated off again by sedimentation from the wastewater subsequently to the activation tank, in the secondary clarification tank and in part recirculated to the activation tank. Complete separation of the microorganisms is not possible by a sedimentation process, and therefore microorganisms which are harmful to health can sometimes pass into the environment together with the wastewater. European union directives for keeping water bodies clean, which guidelines have already been substantially converted to national legislation, however, prescribe on a Europe-wide basis that only biologically clarified wastewater which is essentially free from microorganisms may be allowed to drain off into the environment. The microorganisms are generally separated off by fine filters which reliably separate off microorganisms.

In Germany, primarily in rural areas, in particular in eastern Germany, predominantly for technical or economic reasons, currently an estimated 5.3 million people are not connected, to the municipal wastewater grid. Those affected, as a consequence of the EU directives, had to be provided with facilities by Dec. 31, 2005, either by connection to the municipal grid or by the operation of a small sewage treatment plant. This situation created a high demand for decentralized wastewater treatment plants which is maintained to date.

Small sewage treatment plants are relatively widely distributed, which sewage treatment plants consist of a round concrete container which again is subdivided into three chambers (preliminary clarification/activation tank/secondary clarification). The preliminary clarification is used first to remove coarse components from the wastewater mechanically or by simple sedimentation. The coarse components which are separated off must be pumped off at regular time intervals. The activation tank contains microorganisms which perform the biological purification, the secondary clarification tank serves for separating off the microorganisms which have been introduced and their recirculation to the activation tank and/or to the preliminary clarification tank. This equipment can be supplemented, for example, by a compressor which feeds oxygen to the activation tank via a membrane tube aerator, and also a submersible motor pump for transporting the excess sludge.

In an activation tank, in the course of time, excess clarified sludge forms which must be regularly drawn off by suction. Alternatively, what are termed moving-bed processes are also known in which the amount of excess sludge is generally drastically reduced. In contrast to the classical activation tank, in moving-bed processes, free-floating plastic bodies are employed which can fill up the activation tank virtually completely. Microorganisms are found in this case both on the plastic bodies and also freely suspended in the water.

In recent years, as a further development of the known moving-bed methods, increasingly what are known as WSB® methods (fluidized bed-moving bed-biofilm methods) have been able to become established. Such methods are described, for example, in DE 10127554 and also in DE 196 23 592. In those methods also, plastic bodies serve as carriers which can be colonized by the microorganisms. The microorganisms in WSB® methods are, however, generally localized virtually completely on the carrier material. Whereas in fluidized-bed methods operations were originally carried out exclusively anaerobically (without aeration), in WSB® methods, as a result of the introduction of air, the plastic carriers colonized by microorganisms are optimally and uniformly distributed (or "fluidized") in the activated zone and are situated in the moving suspension, which gave rise to the name Wirbel-Schwebe-Bett (WSB®) (fluidized bed-moving bed). Even in the case of greatly varying inflow, e.g., in the holiday period, the biological system in the activation tank always remains intact.

However, there is also the problem in the case of wastewater purification by a WSB® method that microorganisms are discharged into the environment, that is to say microbe-containing wastewater is introduced into the activated soil zone or into a receiving body of water.

To avoid harmful microorganisms from being introduced into the activated soil zone and/or to enable treated wastewater to be able to be reused as service water, the wastewater must therefore be additionally filtered.

For instance, DE 19807890 described a sewage treatment plant, the wastewater of which is filtered through submerged microfiltration membranes to pass it thereafter into a service water reservoir and reuse it. DE 20315451 describes a microfiltration device as a retrofitting set for a small sewage treatment plant which is connected downstream of the activation tank but upstream of the actual outlet of the sewage treatment plant.

In those cases, organic filter membranes are used which are arranged in a module form. However, organic filter membranes have the disadvantage that they can only be regenerated or chemically cleaned inadequately, so that all of these membranes must generally be renewed in relatively short time periods (<1 year). In addition, organic membranes have only a restricted mechanical stability, such that at relatively high liquid pressures, they can easily be damaged. The use of organic membranes becomes particularly serious in the above-mentioned moving-bed methods, in particular, in the WSB® method, since in these, as a result of the plastic carrier particles which can move freely in the activation tank, mechanical defects on the organic membrane can be caused as a result of which the low-stability organic filter membranes can be destroyed within a short time.

The use of filter membranes is in addition linked with the fundamental problem that during filtration, a covering layer is deposited on the outer surface of the membrane (what is termed "fouling") which provides resistance to the material to be filtered. This leads to a drastic reduction in filter performance to total blockage and, therefore, to total loss of the filter membrane.

Detachment of this covering layer on the membrane requires regular cleaning. In this operation the permeate stream is reversed so that the previously filtered water is then pumped back through the filter membrane in the opposite direction (backwashing). As a result, the covering layer is at least in part detached, as a result of which the efficiency of the filter performance is increased again for a certain time. However, this procedure generally requires separate equipment. In addition, cleaning is at the cost of losing already filtered water which greatly reduces the efficiency of the overall system.

It could therefore be helpful to provide a simple and inexpensive solution for purifying wastewaters.

SUMMARY

We provide a filtration appliance for wastewater purification including at least one ceramic-based membrane that separates microorganisms from wastewater.

We also provide a sewage treatment plant, including at least one filtration appliance for wastewater purification.

We further provide a method of purifying wastewater including separating microorganisms situated in the wastewater by contact with at least one ceramic-based membrane.

BRIEF DESCRIPTION OF THE DRAWINGS

The above and other advantages of our disclosure will become apparent from the description of the following example and the figures. The individual features can be implemented each alone or in combination with one another. The examples and figures serve only for illustration and for better understanding and are in no way to be understood as being restrictive.

In the figures.

On the right: microscopic detail of a cross section through a membrane plate. In the lower region (dark, the relatively coarse-grained structure of the porous ceramic of the membrane plate may be seen. At the top (light), the significantly finer structure of a thin coating (here only consisting of a separation layer) on the porous ceramic may be seen.

Figure 1:
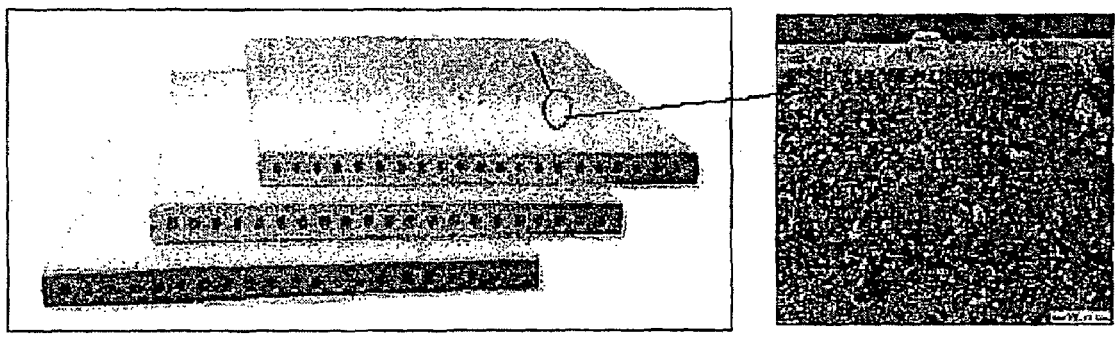
FIG. 1 shows on the left: membrane plates for a preferred embodiment of the filtration device having channels for conducting away purified water. In each case the exits of a plurality of channels in the membranes which are arranged in parallel to one another may be seen. The channels serve for conducting away the purified wastewater.
Figure 2:
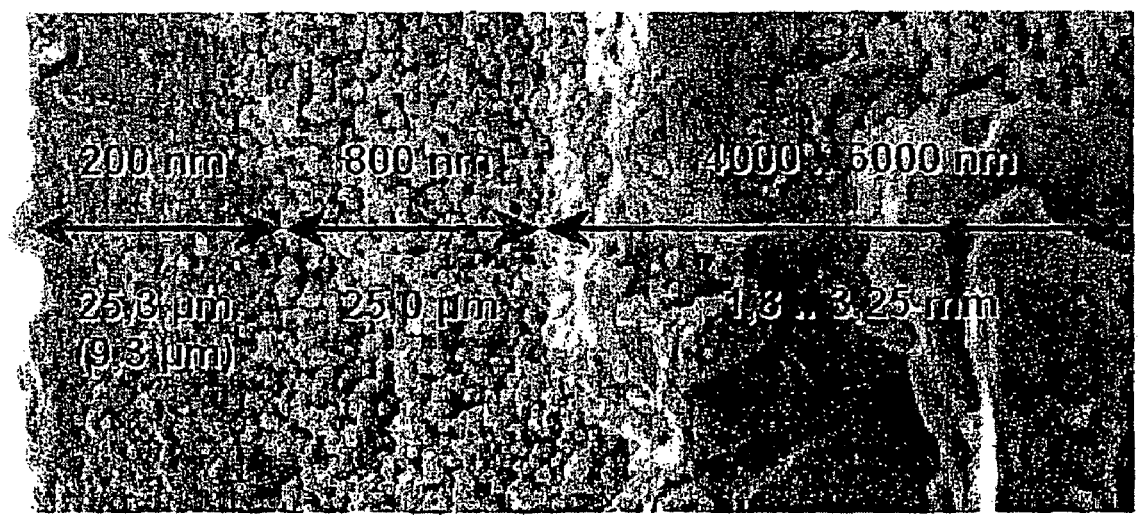

FIG. 2 shows an SEM image of a section through a membrane plate. Three layers may be seen, namely on the left the separation layer, in the center a further porous layer and on the right a membrane plate made of a porous ceramic. The layers and the membrane plate itself each consist of aluminum oxide. The separation layer and the further porous layer each have a thickness of approximately 25 µm. The thickness of the membrane plate is up to 3.25 mm. The pore size decreases toward the separation layer from 4000 to 600 nm (membrane plate) through approximately 800 nm (central further porous layer) to approximately 200 nm (separation layer).

Figure 3:
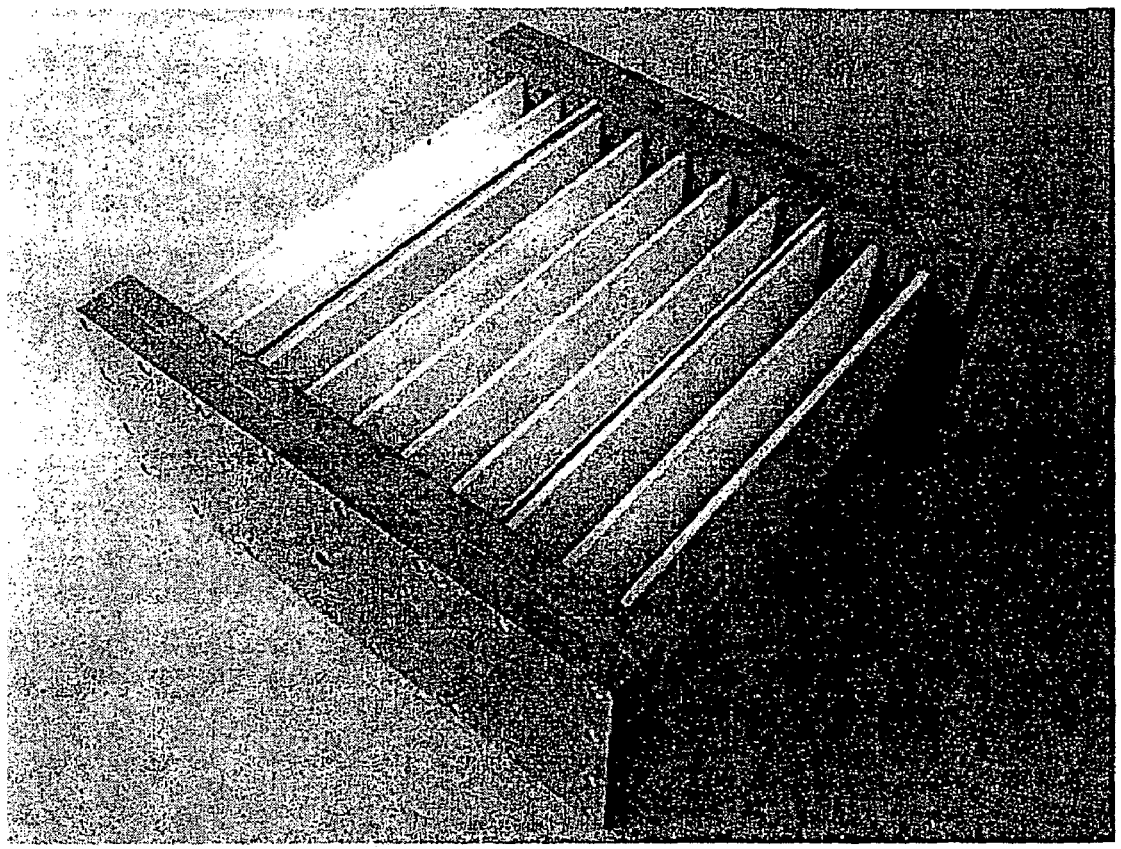

FIG. 3 shows a filtration appliance having ten membrane plates arranged parallel to one another.

DETAILED DESCRIPTION

We provide a filtration appliance for wastewater purification in particular for use in a sewage treatment plant, in particular in a small sewage treatment plant. It is distinguished in that it comprises at least one ceramic-based membrane for separating off microorganisms.

A ceramic-based membrane is distinguished by resistance to biological or chemical action and also by high mechanical stability. In contrast to the organic filter membranes which are known from the prior art, which have been used to date in small sewage treatment plants, a filtration appliance having a ceramic-based membrane may therefore be used without problems also in moving-bed methods, in particular also in small sewage treatment plants operated according to the WSB® method. It withstands without problems the biological action caused by the microorganisms and at the same time reliably separates these off. Fine solids and suspended matter can, if appropriate, also be reliably separated off. At the same time, it is resistant to mechanical action, for example, due to plastic carrier particles floating in the activation tank. This becomes particularly positively noticeable with respect to maintenance intervals and lifetime of the membrane.

Preferably, a membrane of a filtration appliance is a membrane plate made of a porous ceramic. In principle, the shape of the membrane plate may be freely chosen. For instance, round or rectangular membrane plates may be preferred, matched to the respective individual case.

In a preferred structure, the membrane plate has a coating. This preferably comprises at least one separation layer which consists at least in part, in some preferred structures, essentially completely, of nanoscale particles. Preferably, the separation layer has a fraction of nanoscale particles of at least about 5% by weight, particularly preferably of at least about 25% by weight, in particular of at least about 40% by weight.

Nanoscale particles are taken to mean particles having a median particle size of less than about 1 µm, preferably less than about 500 nm, in particular less than about 100 nm, particularly preferably less than about 50 nm. These size figures relate to values which were obtained by means of light-scattering experiments.

The membrane plate coating may consist exclusively of the at least one separations layer. In a particularly preferred structure, the coating, however, further comprises at least one further porous layer which is arranged between the membrane plate and the at least one separation layer. The at least one separation layer is preferably the outer layer at which the microorganisms are essentially separated off.

The coating situated on the membrane plate preferably has a thickness between about 100 nm and about 150 µm, preferably between about 500 nm and about 100 µm, in particular from approximately about 25 µm to about 60 µm. These values preferably also apply to the cases in which the coating consists of the at least one further porous layer and the at least one separation layer.

The thickness of the at least one separation layer is preferably in the range between about 100 nm and about 75 µm, in particular in the range between about 5 µm and about 50 µm, in particular approximately about 25 µm.

The thickness of the at least one further porous layer is preferably in the range between about 100 nm and about 75 µm, in particular in the range between about 5 µm and about 50 µm, in particular approximately about 25 µm.

The porous ceramic of the membrane plate (substrate) has pores preferably having a diameter between about 100 nm and about 10 µm, particularly preferably between about 500 nm and about 6 µm, in particular between about 500 nm and about 3 µm.

The at least one further porous layer has pores preferably having a diameter between about 500 nm and about 2 µm, particularly preferably between about 500 nm and about 1 µm, in particular between about 600 nm and about 900 nm.

In the case of a membrane plate provided with at least one separation layer, in particular the pore size of the at least one separation layer is very important for separating off the microorganisms. Preferably, a separation layer has pores having a diameter between about 1 nm and about 1400 nm, more preferably between about 50 nm and about 500 nm, in particular between about 50 nm and about 300 nm, particularly preferably between about 200 nm and about 300 nm.

The pore size of possibly underlying layers generally does not directly affect the separation of the microorganisms. However, it is preferred that underlying layers have larger pores than the separation layer. Particularly preferably, with respect to the pore size, there is a gradient to the outer separation layer. For instance, it is preferred that the pore sizes decrease towards the outside.

In preferred structures having at least one further porous layer between the at least one separation layer and the membrane plate, the size of the pores of the at least one further porous layer is between the size of the pores of the separation layer (smallest pore sizes) and the size of the pores of the membrane plate (which has the largest pores). This applies in particular to the mean values of pore sizes within the layers (since the pore size is frequently non-uniform within a layer, if appropriate overlapping with respect to the absolute pore sizes can occur, such that, for example, the size of the largest pores of the at least one separation layer can exceed the size of the smallest pores of the at least one further porous layer).

The porous ceramic of the membrane plate is preferably a ceramic based on a metal oxide, in particular based on aluminum oxide. In addition to oxidic ceramics such as aluminum oxide ceramics, in further preferred structures, non-oxidic ceramics can also be used.

The nanoparticles of the separation layer are preferably oxidic nanoparticles, in particular aluminum oxide particles. In addition, in particular, also nanoparticles of zirconium dioxide or titanium dioxide or else mixtures of the oxidic nanoparticles can be preferred. For particularly thin separation layers, in particular zeolites are very highly suitable. In further preferred structures, the nanoparticles can also be non-oxidic nanoparticles.

In a particularly preferred structure of the filtration appliance, the membrane plate has internally at least one channel for the outflow of purified wastewater. Preference, however, is given to a plurality of channels which are preferably arranged in parallel to one another which extend uniformly over the interior of the membrane plate.

A filtration appliance preferably has at least 2 membrane plates. Depending on the individual case, the number of membrane plates can vary greatly. For instance, for purifying relatively small amounts of wastewater, filtration appliances having 3 to 15, in particular 3-10 membrane plates can be preferred. If larger amounts of wastewater are produced, however, filtration appliances having several hundred membrane plates are also possible.

A filtration appliance preferably has a modular structure which enables the number of membrane plates to be varied in accordance with the respective requirements.

In a particularly preferred structure of the filtration appliance, the at least 2 membrane plates are arranged essentially parallel to one another. In that case, it is further preferred that the distance between a plurality of membrane plates which are arranged essentially parallel to one another is essentially always the same.

As has already been described, the shape of a membrane plate in a filtration appliance can in principle be selected freely, depending on the individual case. The same applies in principle also to the dimensions of a membrane plate, wherein the length or width of a membrane plate generally does not exceed about 150 cm. For instance, in a preferred embodiment, a rectangular membrane plate has a length of approximately about 50 cm and a width of approximately about 11 cm.

The thickness of a membrane plate in a filtration appliance is generally preferably in the range between about 0.15 mm and about 20 mm, in particular between about 0.5 mm and about 10 mm. In a particularly preferred embodiment, a membrane plate has a thickness of approximately about 6 mm.

A sewage treatment plant is distinguished in that it has at least one filtration appliance. Preferably, a sewage treatment plant is a small sewage treatment plant, in particular having a purification output for 1 to about 5000 persons (up to a resident, figure of 5000).

The filtration device has already been adequately explained. The corresponding parts of the description are hereby explicitly incorporated herein by reference.

Preferably, a sewage treatment plant has at least one activation tank for wastewater. In this the wastewater is biologically purified by microorganisms.

In a further preferred arrangement of the sewage treatment plant, at least one secondary clarification tank for wastewater is connected downstream of the at least one activation tank.

A filtration device can in this case be connected not only directly to an activation tank, but also to a secondary clarification tank.

We also provide a method of purifying wastewater, in particular in a sewage treatment plant. This is distinguished in that microorganisms situated in the wastewater are separated off by means of at least one ceramic-based membrane.

The method preferably comprises a biological purification of the wastewater by microorganisms in at, least one activation tank.

In a further preferred aspect a method comprises a secondary clarification of the wastewater in at least one secondary clarification tank.

We also provide for the use of a ceramic-based membrane as filter for separating off microorganisms from wastewaters.

In a preferred aspect, the ceramic-based membrane is a membrane plate made of a porous ceramic which is provided with a, if appropriate, multilayer coating which comprises a separation layer which consists at least in part of nanoscale particles.

Not only the membrane plate, but also the coating comprising the separation layer have been described in the context of the explanations of the filtration appliance. Here also, correspondingly, reference is made to the relevant parts of the description.

EXAMPLE

In a long-term experiment, a study was made of how stably a filtration appliance behaves on operation (moving-bed method). In this study, moldings made of plastic (K1 Biofilm Carrier Elements from Kaldness, 3103 Tøonsberg, Norway) were constantly in contact with the membrane of a filtration appliance. Even after a plurality of weeks, however, neither damage nor wear of the membrane could be observed, and the membrane throughput was also very satisfactory.

The invention claimed is:

1. A filtration appliance for wastewater purification, comprising at least two membrane plates for separating microorganisms made of a porous ceramic are arranged essentially in parallel to one another, each of the membrane plates having internally at least one channel for the outflow of purified wastewater and a thickness between 0.5 mm and 10 mm, wherein the membrane plates have a coating with a thickness between 100 nm and 150 μm which comprises a separation layer having pores with a diameter between 1 nm and 1400 nm and which consists at least in part of nanoscale particles.

2. The filtration appliance as claimed in claim 1, wherein the coating comprises at least one porous layer arranged between the membrane plate and the separation layer.

3. The filtration appliance as claimed in claim 1, wherein the coating has a thickness between about 500 nm and about 100 μm.

4. The filtration appliance as claimed in claim 1, wherein the coating has a thickness between about 25 μm and about 60 μm.

5. The filtration appliance as claimed in claim 1, wherein the porous ceramic of the membrane plate has pores having a diameter between about 100 nm and about 10 μm.

6. The filtration appliance as claimed in claim 1, wherein the porous ceramic of the membrane plate has pores having a diameter between about 500 nm and about 6 μm.

7. The filtration appliance as claimed in claim 1, wherein the porous ceramic of the membrane plate has pores having a diameter between about 500 nm and about 3 μm.

8. The filtration appliance as claimed in claim 1, wherein the separation layer has pores having a diameter between about 50 nm and about 300 nm.

9. The filtration appliance as claimed in claim 1, wherein the separation layer has pores having a diameter between about 200 nm and about 300 nm.

10. The filtration appliance as claimed in claim 1, wherein the porous ceramic of the membrane plate is an oxidic ceramic.

11. The filtration appliance as claimed in claim 1, wherein the porous ceramic of the membrane plate is based on aluminum oxide.

12. The filtration appliance as claimed in claim 1, wherein the nanoparticles of the separation layer are oxidic nanoparticles.

13. The filtration appliance as claimed in claim 1, wherein the nanoparticles of the separation layer are selected from the group consisting of aluminum oxide, zirconium dioxide, titanium dioxide and mixtures thereof.

14. The filtration appliance as claimed in claim 1, wherein the distance between a plurality of membrane plates arranged essentially parallel to one another is substantially the same.

15. The filtration appliance as claimed in claim 1, wherein the membrane plate has a thickness between about 0.15 mm and about 20 mm.

16. A sewage treatment plant comprising at least one filtration appliance as claimed in claim 1.

17. The sewage treatment plant as claimed in claim 16, further comprising at least one activation tank for wastewater.

18. The sewage treatment plant as claimed in claim 16, further comprising at least one secondary clarification tank for wastewater.

19. The method of purifying wastewater comprising separating microorganisms situated in the wastewater by contact with a filtration appliance as claimed in claim 1.

20. The method as claimed in claim 19, further comprising biologically purifying the wastewater with microorganisms in at least one activation tank.

21. The method as claimed in claim 19, further comprising secondarily clarifying the wastewater in at least one secondary clarification tank.

* * * * *